Dec. 25, 1945.  E. C. SHAW  2,391,802

LOG BARKER CONVEYER

Filed April 22, 1944

Inventor
E. C. Shaw
by William S. Gates
Attorney

Patented Dec. 25, 1945

2,391,802

UNITED STATES PATENT OFFICE 2,391,802

LOG BARKER CONVEYER

Ernest C. Shaw, Milwaukee, Wis., assignor to Allis-Chalmers Manufacturing Company, Milwaukee, Wis., a corporation of Delaware Application April 22, 1944, Serial No. 532,257

4 Claims. (Cl. 198—103)

This invention concerns improvements in feeding conveyers particularly for use in feeding cylindrical objects longitudinally into the trough formed by a pair of parallel rolls set close together with their axes parallel to the line of motion of the objects being fed.

The invention finds one form of utility in the feeding of logs of varying diameter into a log barking and cleaning machine of the type shown in the patent to E. C. Shaw and W. G. Hagmaier U. S. 2,338,136.

An object of the invention is to provide a conveyer which will feed objects of varying sizes longitudinally into the trough of a pair of parallel rolls in a straight line parallel to the roll axes.

Another object of the invention is to provide a conveyer chain link of a novel form.

The invention having the above and still further objects can best be carried into practical effect as fully described below in connection with the drawing in which.

Figure 1:
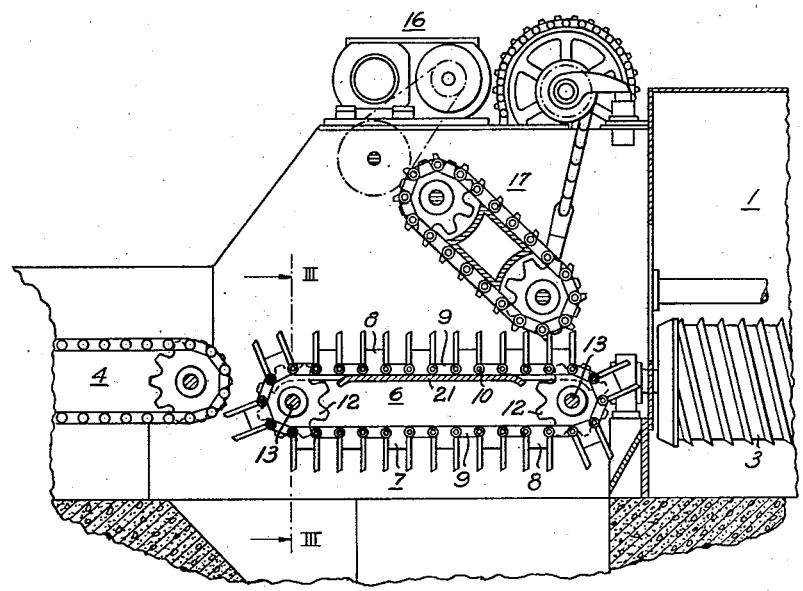
Fig. 1 is a fragmentary vertical longitudinal sectional view of a machine embodying the invention.
Figures 2, 3:
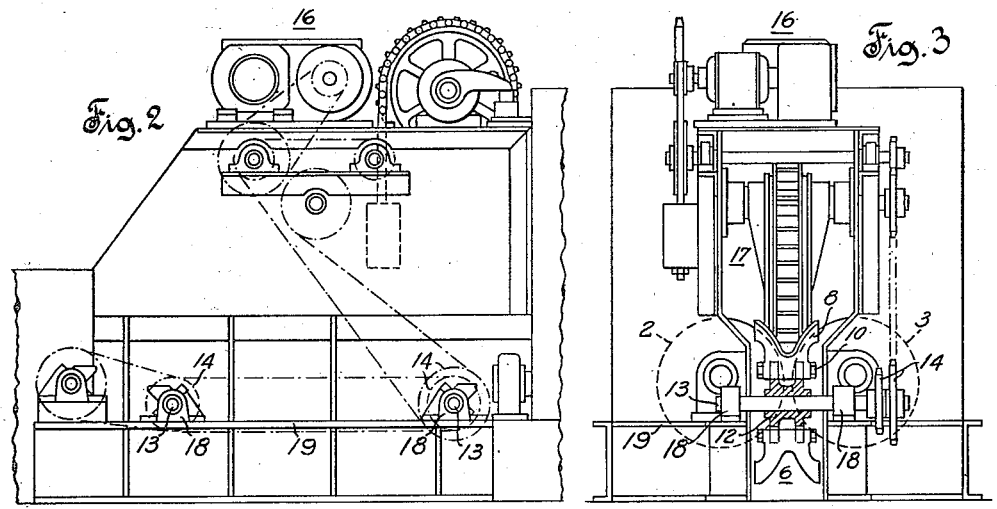
Fig. 2 is a side elevation of the machine as shown in Fig. 1.
Fig. 3 is an end view of the machine partly in cross section on the line III—III.

A machine which may be a log barking machine substantially according to Shaw & Hagmaier Patent 2,338,136 is shown in part at 1 in Fig. 1. The present invention consists in an improvement in conveyer mechanism especially adapted for use in combination with such a machine as log barker 1 in which a pair of horizontal parallel rolls 2 and 3 are arranged to receive, rotate and transfer logs as described in U. S. Patent No. 2,338,136 of which applicant is a joint inventor, and in applicant's copending application Ser. No. 531,341 filed on April 17, 1944.

It is highly desirable that logs or other objects of varying size be fed on to the rolls of such a machine in a straight line parallel to the axes of the rolls in such a manner as to enter the trough-like space between the roll surfaces parallel to and as close as is practicable to the roll surfaces in order that jamming of logs or other objects against the roll ends may not occur, and in order that the logs or other objects may not tilt down greatly causing their leading ends to be worn excessively, as they come into contact with the rolls by a pencil sharpener-like action.

Previous to applicant's invention it had been customary to utilize either plane surfaced guide boards parallel to the roll surfaces or a flat conveyer at a level above the rolls. The flat conveyer necessarily was high, and small logs would incline downward to a considerable degree and drop a considerable distance. This caused wasteful pencil-sharpener wear on the leading end of the log and often resulted in bouncing or other displacement causing the log to fail to lodge properly in the trough between the rolls. Guide boards offered a centering action so that logs could be fed to the rolls somewhat nearer tangency of the roll surfaces, but the flat boards resulted in variation between the relative level of approach of logs of various sizes and so only partially remedied the problems of feeding the logs to the trough between the rolls. In addition it was necessary to slide the logs along the guide boards which resulted in a paste of power.

Figures 4, 5:
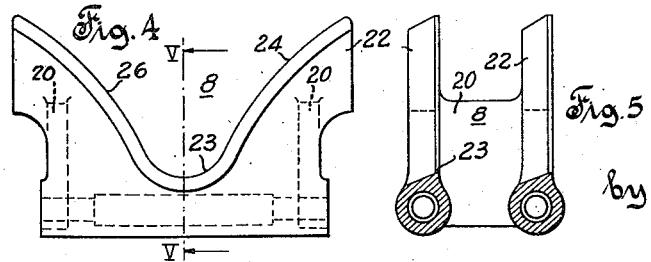
Fig. 4 is a detail end view of a chain link.
Fig. 5 is a cross sectional view taken on the line V—V of Fig. 4.

According to applicant's invention logs are fed by hand or by any suitable conveyer 4 to a roll feed conveyer 6 according to the invention. Conveyer 6 consists of an endless chain 7 formed of box-like, special links 8, shown in detail in Figs. 4 and 5, joined by plain connecting links 9 and pins 10. A pair of double sprockets 12 engage the chain 7. The sprockets 12 are mounted on parallel shafts 13 carrying driving sprockets 14 arranged for chain drive from a driving motor 16 in any known suitable manner. Motor 16 may be any known type of variable speed rotary power source and may drive a pivotally mounted chain feeder 17 adapted to engage the upper surface of a log or other object in the conveyer 6 regardless of the size thereof. The shafts 13 are rotatably carried in bearings 18 on a frame 19. The frame 19 is provided with a chain supporting table 21 on which the upper flight of conveyer chain 7 rides.

The special links 8 are formed with side tension members 20 joined by parallel end plates 22 having transverse material engaging knife-edges formed in three circular arcs 23, 24 and 26, 23 having the radius of the smallest cylindrical object to be handled and 24 and 26 flaring from tangency with 23 and having radii substantially equal to the radii of rolls 2 and 3 onto which the conveyer is to feed objects. These curved edges may be said to form material receiving notches in plates 22 of which the sides 24 and 26 are relatively convex, upwardly divergent, non-intersecting arcs. The links 8 of the upper flight of the conveyer form a trough having an arcuately flared cross contour, that is, the trough has relatively convex, upwardly divergent, laterally spaced, parallel, cylindrical sides, substantially coincident with an axial extension of the roll surfaces 2 and 3 and may be, as shown in the drawing, parallel to and slightly above the trough between the roll surfaces extended axially.

As a result of the special formation of the links 8 according to applicant's invention, any substantially cylindrical article of diameter between the minimum as limited by the separation of rolls 2 and 3 and the radius of arc 23 and the upper limits determined by the diameter of a circle tangent to the arcs 24 and 26 at their upper extremities, or almost any object in the form of a beam, will be centered in the trough portion by flaring arcuate edges 24 and 26 and will be fed longitudinally onto the rolls 2 and 3 in a straight line parallel to the roll axes in an attitude substantially alined to its final position when supported by the roll surfaces after leaving the conveyer. Its entry onto the rolls will be unimpeded by contact with the roll ends and its drop to the roll surfaces will be negligible so that in the case of logs being fed to a log barker there will be no pencil-sharpener effect due to inclination of the log as its leading end contacts the rolls 2 and 3, while its trailing end is still supported on the conveyer 6. The rolls 2 and 3 can engage leading end of the log in frictional driving relation, and commence to rotate and feed it forward while its trailing end is still supported on conveyer 6.

While the conveyer is of particular utility in connection with a log barker and with the feeding of cylindrical objects endwise into a trough between parallel rolls, it will be understood that the invention is not confined to the specific mechanism described and shown in the drawing but is intended to embrace all such equivalents as may readily occur to persons skilled in the art and is limited only by the scope of the appended claims.

It is claimed and desired to secure by Letters Patent:

1. An endless chain conveyer comprising a series of links, means connecting said links to form an endless chain, means to support and drive said chain with its upper flight in longitudinal motion substantially in a horizontal straight line, said links having curved transverse material engaging knife-edges alined in said upper flight to form a material receiving and conveying trough with upwardly divergent relatively convex laterally spaced parallel cylindrical sides.

2. A conveyer chain link having at least one material engaging knife-edge in a plane transverse to the longitudinal axis of said link, said knife-edge being curved in its own plane to form a material receiving notch with opposed upwardly divergent non-intersecting relatively convex arcuate sides.

3. A link for a conveyer chain comprising side tension members, end plates transverse to the longitudinal axis of said link, said end plates having longitudinally alined notches with upwardly divergent non-intersecting relatively convex arcuate sides for tangentially engaging and cradling generally cylindrical objects parallel to said longitudinal axis of said link.

4. In combination, a pair of rotating parallel cylindrical rolls for supporting and rotating an elongated object cradled in tangential engagement therewith, means for feeding elongated objects longitudinally onto said rolls, said feeding means comprising a conveyer presenting at least one pair of spaced transverse object-engaging knife-edges, each curved in its own plane to form a material receiving notch with opposed upwardly divergent nonintersecting relatively convex arcuate sides, in linear motion toward said rolls with the said opposed arcuate sides of said notches in substantially coaxial relation to and alined with the cylindrical surfaces of said rolls.

ERNEST C. SHAW.